United States Patent
Hernandez

(10) Patent No.: US 8,975,557 B2
(45) Date of Patent: Mar. 10, 2015

(54) METHOD AND DEVICE FOR TREATING A SURFACE

(75) Inventor: Caroline Hernandez, Peyrolles (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 946 days.

(21) Appl. No.: 13/062,657

(22) PCT Filed: Sep. 7, 2009

(86) PCT No.: PCT/EP2009/061517
§ 371 (c)(1),
(2), (4) Date: May 24, 2011

(87) PCT Pub. No.: WO2010/026242
PCT Pub. Date: Mar. 11, 2010

(65) Prior Publication Data
US 2011/0215075 A1   Sep. 8, 2011

(30) Foreign Application Priority Data

Sep. 8, 2008 (FR) .................................. 08 56013

(51) Int. Cl.
*B23K 26/00* (2014.01)
*B24C 1/06* (2006.01)
(Continued)

(52) U.S. Cl.
CPC . *B24C 1/06* (2013.01); *B23K 35/22* (2013.01); *B24C 1/08* (2013.01); *B24C 9/003* (2013.01)
USPC ............... 219/121.85; 219/121.6; 219/121.84

(58) Field of Classification Search
USPC ............... 219/121.6, 121.78, 121.84, 121.85; 427/446; 451/36, 37, 87, 102
See application file for complete search history.

(56) References Cited

U.S. PATENT DOCUMENTS 3,290,163 A * 12/1966 Elbreder .................... 106/467
4,365,135 A   12/1982 McWilliams
(Continued)

FOREIGN PATENT DOCUMENTS

DE   1 596833   12/1966
DE   27 20 547   5/1977
(Continued)

OTHER PUBLICATIONS

Griffiths et al., "Characterisation of short pulse laser target debris at the HELEN laser facility", Dec. 2005, Proc. of SPIE, vol. 5991, pp. 59910L-1 to 55910L-11.*
(Continued)

Primary Examiner — Geoffrey S Evans
(74) Attorney, Agent, or Firm — Knobbe Martens Olson & Bear LLP

(57) ABSTRACT

A method for treating a surface is disclosed. According to some aspects, the method includes ejecting matter from the surface by projecting an ejection agent on the surface. The ejection agent is selected from gases, fluids in supercritical state, solid materials in divided form, solid materials in a gas vector and electromagnetic radiation. The method includes trapping the ejected matter in one or several pieces of an aerogel situated on trajector of the ejected matter. A device for carrying out this method as well as the use of an aerogel to trap the matter ejected from a surface during a treatment of that surface are also disclosed. The method may be applied in fields including cleaning, satinizing, polishing, deburring, etching, marking, pre-adhesion surface preparation metallization enameling, painting or varnishing operations are done, in particular electronics, microelectronics, optics, optoelectronics, bijouterie, jewelry, and the restoration of art and antiques.

22 Claims, 2 Drawing Sheets

(51) Int. Cl.
  *B23K 35/22*   (2006.01)
  *B24C 1/08*    (2006.01)
  *B24C 9/00*    (2006.01)

(56)             References Cited

U.S. PATENT DOCUMENTS

| | | | | |
|---|---|---|---|---|
| 5,362,941 | A | * | 11/1994 | Johnson et al. .......... 219/121.84 |
| 5,780,806 | A | * | 7/1998 | Ferguson et al. ........ 219/121.68 |
| 5,881,445 | A | | 3/1999 | Mauro |
| 6,407,385 | B1 | * | 6/2002 | Okada ........................ 250/307 |
| 6,692,337 | B2 | * | 2/2004 | Jennings et al. ......... 219/121.84 |
| 2004/0045667 | A1 | * | 3/2004 | Yogev et al. ............. 219/121.68 |
| 2004/0206732 | A1 | * | 10/2004 | Brask ....................... 219/121.68 |
| 2008/0023453 | A1 | * | 1/2008 | Zhang ...................... 219/121.63 |
| 2010/0071554 | A1 | * | 3/2010 | Pfeffer et al. ................... 95/275 |

FOREIGN PATENT DOCUMENTS

EP         1 188 520 A2      3/2002
WO    WO-2008/055208 A1  *  5/2008

OTHER PUBLICATIONS

Tobin et al., "Using Silica Aerogel to characterize hypervelocity shrapnel produced in high laser experiments", Dec. 2003, International Journal of Impact Engineering, vol. 29, pp. 713-721.*

International Search Report dated Oct. 16, 2009, of related application PCT/EP2009/061517, filed Sep. 7, 2009.

* cited by examiner

METHOD AND DEVICE FOR TREATING A SURFACE

TECHNICAL FIELD

The present invention relates to a method for treating a surface, a device making it possible to carry out said method, and the use of an aerogel to trap the matter ejected from a surface during the treatment to which that surface is subjected.

It is applicable in all fields where cleaning, satinizing, polishing, deburring, etching, marking, or surface preparation, e.g. the creation of roughnesses before adhesion, metallization, enameling, painting or varnishing operations are done.

It is more particularly useful in fields where these types of operations are done on pieces that, because they are small or precious or because they have embrittled surfaces, require high-precision treatments.

Such fields are in particular electronics, microelectronics, optics, optoelectronics, bijouterie, jewelry, and the restoration of art and antiques.

BACKGROUND OF THE INVENTION

Many surface treatment techniques exist and, in particular, techniques for cleaning polluted surfaces, which are based on a chemical or physical interaction between the surface to be treated and an agent that is projected on that surface at a more or less high speed.

These primarily concern techniques that consist of projecting:
- a pressurized liquid such as water, organic solvent, or nitrogen, possibly in combination with ultrasounds, or a gas such as compressed air; or
- an abrasive—i.e. a product assuming the form of finely divided solid particles—alone or in a liquid vector (typically water) or gas vector (typically compressed air); or
- particles of a chemical entity that, under normal temperature and pressure conditions (25° C., 1 atmosphere), is more stable in gas form than in other forms, this entity typically being carbon dioxide that is projected in solid state (i.e. in the form of dry ice) or in supercritical state and that goes directly from that state to the gaseous state (i.e. without going through the liquid state); or
- electromagnetic radiation of the laser beam or microwave type, which results in causing a brutal change of the physical parameters of the surface to be treated, such as its temperature, which leads to the vaporization and dispersion of said surface.

Regardless of the technique used, the user may wish, in particular in the context of cleaning a polluted surface, to recover the waste produced by the surface treatment either to analyze the waste, for example to determine its size or composition, or to prevent it from being redeposited on the surface to be treated or from contaminating the environment of that surface, for example if the waste is toxic or radioactive.

Techniques based on the projection of a liquid or an abrasive in a liquid medium make it possible to fairly easily recover the waste generated by the surface treatment, since the liquid that flows from the treated surface naturally tends to bring said waste with it. However, the volumes of liquid used and, therefore, of effluent produced are generally substantial and the operations necessary to isolate the waste from the rest of the effluent, for example if one wishes to analyze it, are expensive. Moreover, interactions inevitably occur between the waste and the liquid that result in physically and/or chemically modifying this waste and, as a result, distorting the analysis thereof.

In the case of techniques based on the projection of a gas, an abrasive in a gaseous medium, carbon dioxide in solid or supercritical state, or electromagnetic radiation, the waste produced by the surface treatment is generally conveyed in a gas flow that is led towards a fibrous or electrostatic filter in which this waste is retained. However, the use of a gaseous flow to convey the waste does not prevent part of said waste from being redeposited on the treated surface due to the turbulence generated. Moreover, the filters used at this time must be subjected to relatively heavy treatments if one wishes to extract the waste from them for analysis.

Furthermore, regardless of whether the waste is recovered in a liquid flow or a gas flow, this recovery is based, in most systems, on an aspiration of said flow. However, such systems are difficult to use in certain mediums and, in particular, in confined or cramped mediums, as well as under certain working conditions such as depression (vacuum) or high temperature conditions. Moreover, the aspiration noticeably increases the risk of the waste losing its physical integrity and, as a result, distorting the analysis thereof.

The inventor therefore aimed to provide a surface treatment method that is, in general, free from all of the aforementioned drawbacks.

More specifically, the inventor aimed to provide a surface treatment method making it possible to collect all of the waste produced by this treatment, while keeping the physical and chemical characteristics of said waste intact so as to guarantee the reliability of the analyses to which they are likely to be subjected later.

She also aimed for the method to be applicable to all types of surfaces, irrespective of their nature, size and state, and to be able to be implemented in all types of environments and conditions, in particular pressure and temperature.

She also aimed for this method to be easy to use, not require heavy or expensive equipment, and to have implementation costs compatible with industrial requirements.

She also aimed to provide a device that makes it possible to carry out this method.

BRIEF DESCRIPTION OF THE INVENTION

These aims and others are achieved by the invention, which first proposes a method for treating a surface comprised by an object, which comprises:
- the ejection of matter from said surface by projection on said surface of an ejection agent chosen among gases, fluids in supercritical state, solid materials in divided form, possibly in a gas vector, and electromagnetic radiation; and
- trapping the matter thus ejected in one or several pieces of an aerogel situated on the trajectories of said matter.

Thus, according to the invention, the ejection of the matter from the surface to be treated can be done using:
- a gas, such as air;
- a fluid in supercritical state, such as supercritical $CO_2$;
- a solid material in divided form, in which case this material can be an inorganic abrasive (sand, corundum, shots, glass, quartz or ceramic beads, sodium acid carbonate particles, etc.), an organic abrasive (particles of plastic materials such as polyamides, polycarbonates, polyvinyl or acrylic chlorides, wheat or corn starches, wheat flours, agicides of the crushed fruit stone and shell type, etc.), or a non-abrasive material such as dry ice pellets; or electromagnetic radiation, such as a laser beam or microwaves.

According to the invention, it is preferable to use an ejection agent that does not generate waste other than that corresponding to the matter ejected from the surface. This is why it is preferable for this agent to be a gas, a fluid in supercritical state, dry ice, or electromagnetic radiation.

In the context of the invention, the term "aerogel" is used in its usual accepted meaning, i.e. it designates any gel whereof the liquid phase has been replaced by air (by freeze-drying, supercritical drying, etc.) and the liquid network of which has therefore been transformed into a network of pores.

Thus, the aerogel capable of being used as a trap in the inventive method can in particular be:
- an inorganic aerogel with a base of a simple metal oxide such as an aluminum, silica, magnesia, chromium oxide, iron oxide, tin oxide, titanium oxide, vanadium oxide, tungsten oxide, niobium oxide, or zirconium oxide;
- an inorganic aerogel with a base of a mixed metal oxide such as alumina/magnesia oxide, iron/alumina oxide, iron/silica oxide, nickel/alumina oxide, nickel/alumina/silica oxide, silica/alumina, titanium/magnesia oxide, or a multiple metal oxide such as an aerogel of nickel/alumina/silica oxide or mullite; or
- an organic aerogel such as an aerogel of agar, rubber, polyamide, polyester, polyurethane, polyphenol, divinylbenzene, phenol/formaldehyde, urea/formaldehyde, melamine/formaldehyde, resorcinol/formaldehyde, phloroglucinol/formaldehyde, or polyvinyl chloride.

The structure of the aerogels, their properties, and the method for obtaining them have been greatly described in the literature. In this respect, the reader may, for example, see files N20 and J2230 of TECHNIQUES DE L'INGENIEUR, respectively entitled <<Aérogels. Aspect matériau>> and <<Elaboration des gels et aérogels>>.

In a certain number of cases and, in particular, when the surface treatment consists of cleaning, the inventive method is, preferably, carried out in a controlled atmosphere enclosure or chamber in which, for example, a pressure reigns that is lower than the atmospheric pressure, typically from $10^{-2}$ to $10^{-8}$ Pa, as well as potentially a temperature higher than the ambient temperature, for example a temperature from 50 to 300° C. This enclosure can in particular be a vacuum chamber.

The ejection agent is then projected on the surface to be treated using projection means that can be arranged inside or outside the enclosure depending on the nature of the ejection agent. Thus, if the ejection agent is electromagnetic radiation and, in particular, a laser beam, the ejection means can be arranged outside the enclosure. In the latter case, it is sufficient for the enclosure to be made from a material transparent to the wavelength of the electromagnetic radiation or to comprise a porthole made from such a material so that the electromagnetic radiation can penetrate said enclosure.

Furthermore, the ejection agent can be projected on the surface to be treated along an axis orthogonal to said surface or, on the contrary, along an axis that is inclined relative to the normal of said surface, the angle formed by this axis and this normal then generally being from 20 to 70° and, most often, from 30 to 60°.

Moreover, the ejection agent can reach the surface to be treated without passing through the aerogel piece or any one of the aerogel pieces or, on the contrary, reach said surface after having passed through the aerogel piece or one of the aerogel pieces. In the latter case, the aerogel piece thus passed through can be provided with a through opening with dimensions suitable for allowing the ejection agent to pass, or can be formed by several aerogel blocks not attached to each other, or also, if the ejection agent is electromagnetic radiation, and in particular a laser beam, be made up of an aerogel transparent to the wavelength of said radiation.

Thus, for example, certain aerogels such as silica-based aerogels and melamine/formaldehyde-based aerogels are transparent to visible light ($\lambda$=400-800 nm) and can advantageously be used in the event the chosen implementation configuration of the method involves the aerogel piece or at least one of the aerogel pieces provided to trap the matter ejected from the surface to be treated being transparent in the visible range.

According to one particularly preferable embodiment of the inventive method, the ejection agent is a laser beam due to the many advantages offered by the use of this type of beam in surface treatments and, in particular, the precision with which this treatment can be done, the absence of abrasive effects, and more generally aggressive effects for the surface to be treated, the absence of pollution related to this treatment (no contribution of matter, or gas emanation), and the simplicity of handling a laser.

The laser is preferably a gas laser of the excimer laser or $CO_2$ TEA ("Transversely Excited Atmospheric pressure") laser type, or a crystalline laser, typically with a YAG matrix, i.e. made up of an aluminum garnet enriched with yttrium, of the Yb:YAG type (doped with ytterbium) or Nd:YAG type (doped with neodyme).

It is generally used in pulsed mode, in which case the duration of the pulses, their frequency, and the fluence (i.e. the energy of the pulses per surface unit) must be adapted to the nature of the matter to be ejected from the surface to be treated, as well as that of the surface in the event the surface to be treated and the matter needing to be ejected therefrom are not of the same nature, which will, for example, be the case if the treatment of the surface consists of stripping.

Thus, for example, to strip the surface of a carbon substrate covered with a layer of gray epoxy paint, it is possible to use a pulsed laser of the Nd:YAG type, with a wavelength of 1064 nm, with a pulse length of 100 ns, a repetition rate of 10 kHz and a fluence greater than 1 $J/cm^2$.

When the ejection agent is a laser beam, the matter ejected from the surface to be treated is contained in a plume called "plasma plume", with an axis orthogonal to said surface and the morphology of which depends on the nature of the surface to be treated, usage parameters of the laser, and environmental conditions (pressure conditions, for example).

Thus, in this particularly preferred embodiment, the aerogel piece or one of the aerogel pieces is preferably arranged opposite the surface to be treated, while being parallel or substantially parallel thereto, and the projection of said piece in the axis of the plume has, in the plane perpendicular to said axis in which this plume has the largest dimensions (i.e. the largest diameter in the event the plasma plume has a circular transverse section), a perimeter in which the perimeter of said plume fits, so as to guarantee trapping of all of the matter ejected from said surface.

This aerogel piece can have any shape, but preferably assumes the form of a rhomb, in particular a rectangular rhomb such as a cube.

According to the invention, the surface to be treated can be of any type. Thus, it can be an inorganic surface such as a surface made of stone, plaster, cement, glass, metal, metal alloy, ceramic, enamel, porcelain, mineral paint, etc., or organic such as a surface made of carbon, wood, plastic, elastomer, textile (e.g. fabric), organic paint, etc.

Moreover, the object to which the surface to be treated belongs can also be an object that can easily be moved, such as an electronic or optical device, or an object that cannot be moved and that therefore needs to be treated where it is located, such as the facade of a monument.

The treatment of this surface can in particular consist of cleaning, satinizing, polishing, deburring, etching, marking, or an operation consisting of preparing said surface to be subjected later to another treatment such as gluing, metallization, enameling, painting, or varnishing.

It preferably involves cleaning—this term having to be understood in the broad sense, i.e. as encompassing stripping, pollution control, and decontamination from toxic, in particular radioactive, materials—, marking, or etching, the inventive method having, in fact, shown itself to be particularly useful in these three types of treatment.

Whatever the case may be, the inventive method can also comprise the analysis of the matter trapped in the piece(s) of aerogel.

This analysis can consist of a very simple analysis of the matter ejected from the surface to be treated such as, for example, a simple evaluation by weighing the mass of said matter or, on the contrary, can comprise an entire series of operations aiming to physically and/or chemically characterize the matter ejected from the surface to be treated and using techniques such as electronic scanning microscopy or mass spectrometry and, in particular, secondary ion mass spectrometry (SIMS).

The analysis can also consist of determining the ejection speed of the matter from the surface to be treated, in which case a calibration of the penetration depth in the aerogel as a function of the ejection speed is done beforehand.

The invention also relates to a device making it possible to carry out the surface treatment method just described, this device comprising:

means for projecting, on said surface, an ejection agent chosen from gases, fluids in supercritical state, solid materials in divided form, potentially in a gas vector, and electromagnetic radiation; and one or several pieces of an aerogel.

For the same reasons as mentioned above, it is preferable for the means for projecting the ejection agent to be means that make it possible to project a gas, a fluid in supercritical state, dry ice, or electromagnetic radiation.

As before, the aerogel can in particular be chosen from inorganic aerogels based on a simple, mixed, or multiple metal oxide, organic aerogels, and organic-inorganic hybrid aerogels.

According to one preferred embodiment of the device according to the invention, it also comprises a controllable-atmosphere enclosure or chamber, i.e. provided with its own means for establishing and maintaining a controlled atmosphere in said enclosure. The enclosure, which can in particular be a vacuum chamber, comprises means for maintaining the object to which the surface to be treated belongs as well as means for maintaining the aerogel piece(s).

In this embodiment, the means for projecting the ejection agent can be situated inside or outside the enclosure depending on the nature of the ejection agent. Thus, if the ejection agent is provided to be electromagnetic radiation and, in particular, a laser beam, the ejection means can be situated outside said enclosure. In that case, the latter preferably comprises a porthole made from a material transparent to the wavelength of said electromagnetic radiation.

Moreover, the means for projecting the ejection agent and the means for maintaining the object in the enclosure can be positioned relative to each other so that the ejection agent can be projected on the surface to be treated along an axis orthogonal to said surface or, on the contrary, along an axis that is inclined relative to the normal at said surface, the angle formed by this axis and this normal then generally being from 20 to 70° and, most often, from 30 to 60°.

Furthermore, the means for projecting the ejection agent and the means for maintaining the aerogel piece(s) in the enclosure can be positioned relative to each other so that the ejection agent can reach the surface to be treated without passing through the aerogel piece or one of the aerogel pieces or, on the contrary, so that it can reach said surface after having passed through the aerogel piece or one of the aerogel pieces.

According to one particularly preferred embodiment of the inventive device, the means for projecting the ejection agent consist of a laser, preferably a gas laser or a crystalline laser, typically with a YAG matrix.

In this case, the means for maintaining the object and the means for maintaining the aerogel piece(s) are preferably positioned relative to each other so that the aerogel piece or one of the aerogel pieces can be located opposite said surface, while being parallel or substantially parallel thereto.

Moreover, the dimensions of this piece are preferably chosen so that its projection in the axis of the plume provided to be produced by the beam emitted by the laser can have, in the plane perpendicular to said axis in which this plume will have the largest dimensions, a perimeter in which the perimeter of said plume can fit.

The invention also relates to the use of an aerogel to trap the matter that is ejected from a surface comprised by an object during a treatment to which said surface is subjected.

The invention has many advantages, in particular because it provides for using an aerogel as trap.

Indeed:

the aerogels being inert from a chemical perspective, they do not, chemically, alter the matter trapped there;

the aerogels typically having pore sizes in the vicinity of 100 micrometers and a flexible and elastic consistency favoring the penetration of matter without crushing, they also do not, physically, alter the matter trapped there;

the aerogels having a very high porosity (typically greater than 95% and generally beyond 97%), they are capable of trapping very large quantities of matter before reaching saturation;

the aerogels being very light, the aerogel pieces can, even when they have large dimensions, be easily manipulated and in particular be maintained on attachment arms whereof the mobility can be controlled remotely;

the aerogels being heat-resistant (up to 1200° C. for silica-based aerogels), they can be used for surface treatments requiring very high temperatures;

the aerogels having excellent thermal insulation properties, they can perform, aside from the trapping role, a role of heat screen and as such, thermally protect the projection means of the ejection agent when said means are used inside a heated enclosure and thereby decrease, or even eliminate, the need to use systems aiming to cool said enclosure;

a certain number of aerogels being transparent to the visible light, they make it possible to directly view the matter trapped therein.

Other advantages and features of the invention will emerge from the additional description that follows, relative to examples of devices according to the invention and in reference to the appended figures.

It goes without saying that these embodiments are provided solely as illustrations of the object of the invention and should in no way be interpreted as being a limitation of that object.

BRIEF DESCRIPTION OF THE FIGURES

In FIGS. 1 to 3, the same references are used to designate the same elements.

DETAILED DESCRIPTION OF THE INVENTION

Figure 1:
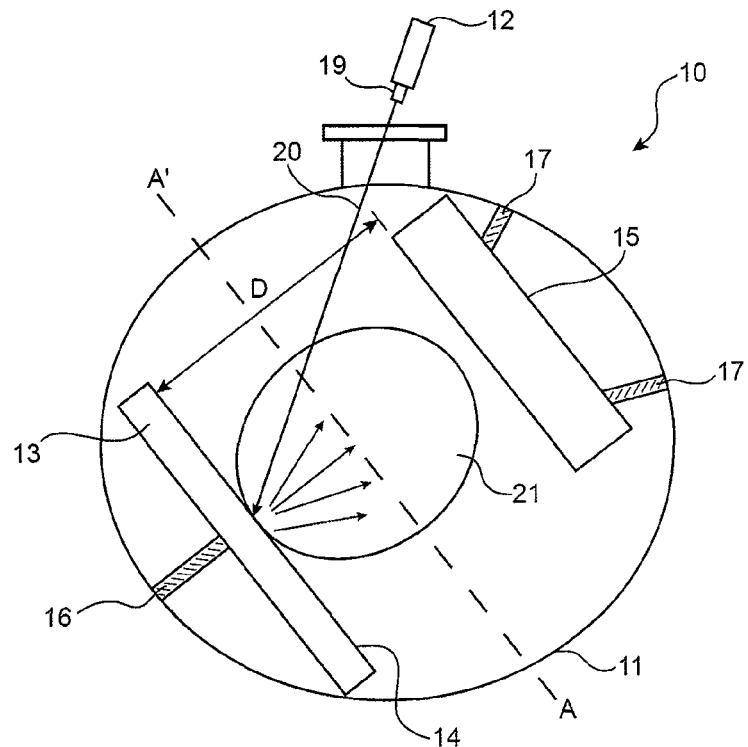
FIG. 1 illustrates, diagrammatically and under in use conditions, a first example of a device according to the invention.

FIG. 1 shows, diagrammatically and under in use conditions, a first example of a device according to the invention specially designed to treat the surface of an object in a controlled atmosphere enclosure, using a beam emitted by a laser situated outside said enclosure.

Thus, as shown in this figure, this device 10 comprises, on one hand, an enclosure 11 that is provided with means (not shown in FIG. 1) capable of establishing and maintaining a controlled atmosphere in said enclosure, and, on the other hand, a laser 12 that is arranged outside said enclosure.

The enclosure 11 contains the object 13 whereof the surface 14 must be treated and, situated opposite said surface and parallel or substantially parallel thereto, a piece of an aerogel 15, with a generally parallelepiped shape.

The object 13 and the aerogel piece 15 are maintained in the enclosure 11 by maintenance means 16 and 17, respectively, which can consist of any device capable of maintaining an object in a determined location, such as an object holder, mounting foot, mounting arm, or similar device. Advantageously, at least one and, preferably, all of these mounting means are mobile and are provided with a system making it possible to adjust their position and, from there, those of the object 13 and the aerogel piece 15.

The enclosure 11 also comprises a porthole 18 opposite which the projection torch 19 of the laser 12 is positioned and which is made up of a material transparent to the emitting wavelength of the laser 12 so as to allow the beam 20 emitted by said laser to pass under in use conditions.

Thus, for example, the porthole 18 can be made from silica glass if the laser 12 emits in the visible range, while it can be made from Pyrex if the laser 12 emits in the near infrared.

The dimensions of the aerogel piece 15 are chosen so that under in use conditions, the projection in the axis of the plasma plume 21 generated by the beam 20 has, in the plane perpendicular to said axis in which the plasma plume 21 has the largest dimensions (which corresponds to plane AA' in FIG. 1), a perimeter in which said plume fits.

Moreover, the distance D separating said piece from the surface 14 is chosen such that all of the matter that, under in use conditions, is ejected from said surface under the action of the beam 20 and that is therefore contained in the plasma plume 21 can be trapped in the aerogel piece 15. Typically, this distance goes from several micrometers to 10 cm depending on the pressure conditions under which the surface treatment is done.

The position of the means 16 for maintaining the object 13 is chosen such that under in use conditions, given the dimensions of the aerogel piece 15 and the distance D that separates said piece from the surface 14, the beam 20 reaches said surface along an axis that is inclined relative to the normal at said surface, without passing through or even touching the aerogel piece 15.

Thus, as an example, to clean the surface of a carbon piece measuring 3 cm long and 3 cm wide in a vacuum chamber provided with a silica quartz porthole and where a pressure reigns from $10^{-4}$ to $10^{-6}$ Pa and a temperature close to ambient temperature, one can use:

a pulsed Yb:YAG laser (wavelength $\lambda=1064$ nm) with an average power of 20 W, with a pulse energy of 1 mJ per pulse, a pulse length of 120 ns, a pulse frequency of 20 kHz, a fluence of 7 J/cm$^2$, and a beam whereof the axis forms a 30° angle with the normal at the surface to be cleaned; and a piece of a silica aerogel having a porosity of 99.7%, which assumes the form of a cube with 4 cm sides that is placed at a distance of 5 to 10 cm from the surface to be cleaned.

Figure 2:
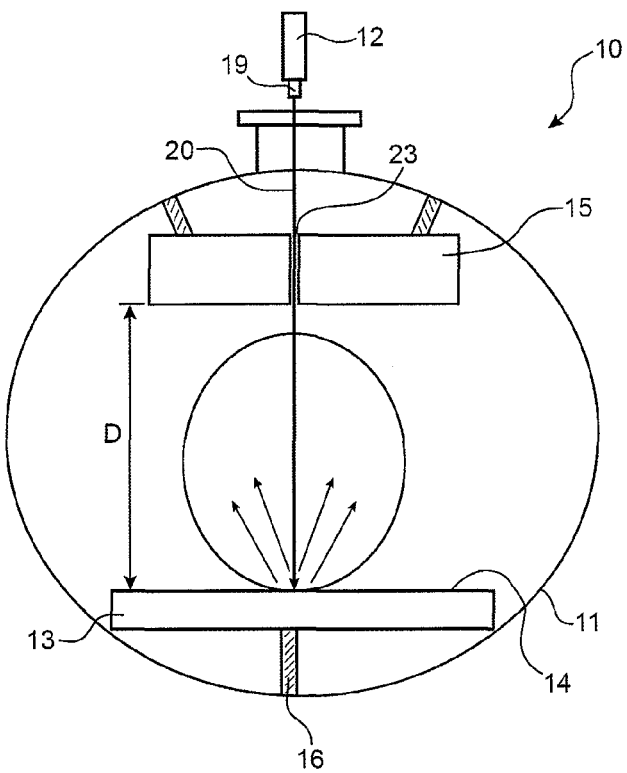
FIG. 2 illustrates, diagrammatically and under in use conditions, an alternative of the device according to the invention shown in FIG. 1.

FIG. 2 shows, diagrammatically and under in use conditions, an alternative of the device 10 illustrated in FIG. 1, in which the means 16 for maintaining the object 13 and, therefore, said object are positioned such that under in use conditions, the beam 20 emitted by the laser 12 reaches the surface 14 along an axis orthogonal to said surface.

Thus, in this alternative, the aerogel piece 15, which is also situated opposite the surface 14, parallel or substantially parallel thereto, is located on the trajectory of the beam 20.

It is therefore either provided with a through opening 23 capable of allowing said beam to pass—as shown in FIG. 2—, or made up of several, for example two, aerogel blocks that are not attached to each other.

Figure 3:
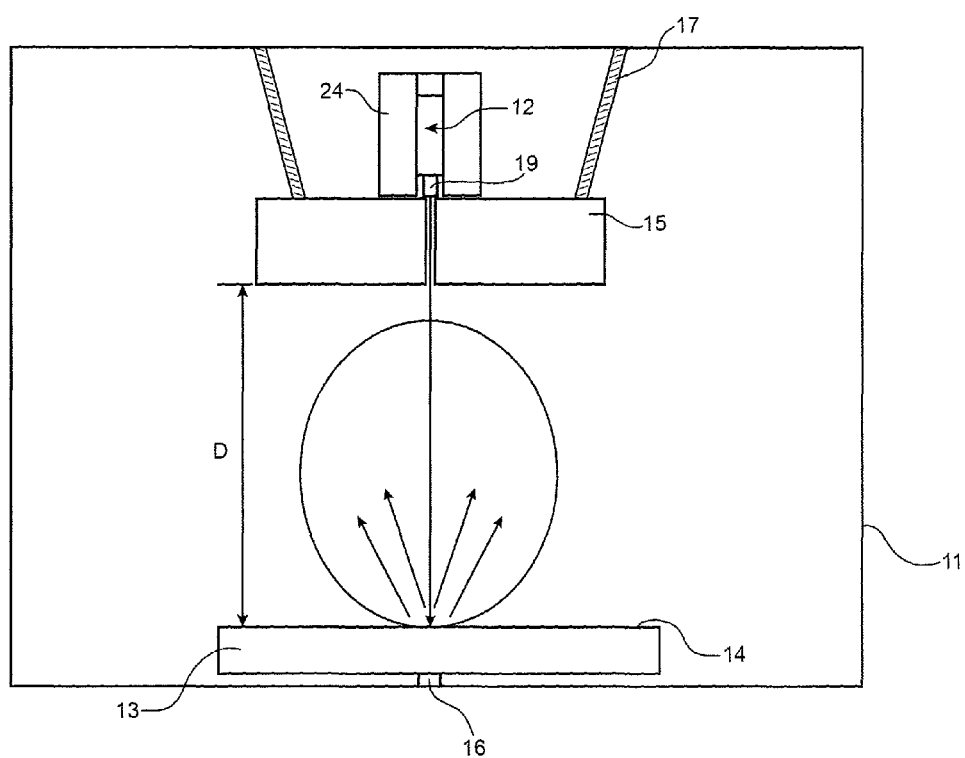
FIG. 3 illustrates, diagrammatically and under in use conditions, a second example of a device according to the invention.

FIG. 3 shows, diagrammatically and under in use conditions, a second example of a device according to the invention, which is specially designed to treat the surface of an object in a controlled atmosphere enclosure, using a beam emitted by a laser situated in said enclosure.

This device 10 differs from that illustrated in FIG. 2 in that the laser 12 is arranged inside the enclosure 11—which therefore no longer includes a porthole 18—and in that the aerogel piece is inserted between said laser and the object 13 whereof the surface 14 must be treated.

The projection torch 19 of the laser 12 is situated directly in contact with the aerogel piece 15 so that under in use conditions, the latter can protect the laser 12 not only from matter ejected from the surface 14, but also from the high temperature likely to reign inside the enclosure 11.

Moreover, the physical and possibly thermal protection of the laser 12 is reinforced by the presence of one or several other aerogel pieces forming a protective sleeve 24 around the laser 12.

Whether the inventive device is of the type illustrated in FIGS. 1 and 2 or the type illustrated in FIG. 3, it is extremely simple to use.

Indeed, one need only introduce the object whereof the surface must be treated and the aerogel piece(s) into the enclosure, position them in the chosen configuration using means with which said enclosure is provided to ensure maintenance thereof, close the enclosure, and establish the atmosphere inside this enclosure in which one wishes to perform the surface treatment to be able to start said treatment.

The laser beam is then projected on the surface to be treated and the matter ejected from said surface under the action of said beam is immediat4ely trapped in the aerogel piece(s).

When the treatment is finished, the object and the aerogel piece(s) are removed from the enclosure and an analysis of the matter contained in the aerogel may be done.

If necessary, the aerogel piece(s) can, of course, be replaced during treatment.

The invention claimed is:

1. A method for treating a surface of an object, the method comprising:
    ejecting a matter from the surface by projecting an ejection agent on the surface, the ejection agent being selected from the group consisting of gases, fluids in supercritical state, solid materials in a gas vector, and electromagnetic radiation; and
    trapping the matter ejected from the surface in one or more pieces of an aerogel that are situated in a trajectory of the ejected matter;
    wherein the ejection agent passes through an aerogel piece before reaching the surface.

2. The method according to claim 1, further comprising the analysis of the matter trapped in the aerogel piece(s).

3. The method according to claim 1, wherein the aerogel is selected from the group consisting of inorganic aerogels, organic aerogels, and organic-inorganic hybrid aerogels.

4. The method according to claim 1, wherein the ejection agent is projected on the surface along an axis orthogonal to the surface.

5. The method according to claim 1, wherein the ejection agent is projected on the surface along an axis that is inclined relative to the normal at the surface.

6. The method according to claim 1, wherein the surface treatment consists of cleaning, marking, or etching.

7. The method according to claim 1, wherein the method is implemented in a controlled atmosphere enclosure.

8. The method according to claim 7, wherein the ejection agent is projected on the surface using projection means that are arranged inside the controlled atmosphere enclosure.

9. The method according to claim 7, wherein the ejection agent is an electromagnetic radiation and is projected on the surface using projection means that are arranged outside the controlled atmosphere enclosure.

10. The method according to claim 1, wherein the ejection agent is a laser beam.

11. The method according to claim 10, wherein the aerogel piece is situated opposite the surface while being parallel or substantially parallel to the surface.

12. The method according to claim 11, wherein the matter ejected from the surface is contained in a plume with an axis orthogonal to the surface and a projection of the aerogel piece in the axis of the plume has, in the plane perpendicular to the axis in which the plume has the largest dimensions, a perimeter in which the perimeter of the plume fits.

13. A device for treating a surface of an object, comprising:
    means for projecting an ejection agent on the surface, the ejection agent being selected from the group consisting of gases, fluids in supercritical state, solid materials in a gas vector, and electromagnetic radiation;
    one or more pieces of an aerogel for trapping a matter ejected from the surface by the ejection agent; and
    a controllable-atmosphere enclosure comprising means for maintaining the object and means for maintaining the aerogel piece(s);
    wherein the means for projecting the ejection agent and the means for maintaining the aerogel piece(s) are positioned relative to each other so that the ejection agent reaches the surface after having passed through an aerogel piece.

14. The device according to claim 13, wherein the aerogel is selected from the group consisting of inorganic aerogels, organic aerogels, and organic-inorganic hybrid aerogels.

15. The device according to claim 13, wherein the means for projecting the ejection agent are arranged inside the controllable-atmosphere enclosure.

16. The device according to claim 13, wherein the means for projecting the ejection agent and the means for maintaining the object are positioned relative to each other so that the ejection agent can be projected on the surface along an axis orthogonal to the surface.

17. The device according to claim 13, wherein the means for projecting the ejection agent and the means for maintaining the object are positioned relative to each other so that the ejection agent can be projected on the surface along an axis that is inclined relative to the normal at the surface.

18. The device according to claim 13, wherein the means for projecting the ejection agent comprises means for projecting an electromagnetic radiation and are arranged outside the controllable-atmosphere enclosure.

19. The device according to claim 18, wherein the controllable-atmosphere enclosure comprises a porthole transparent to a wavelength of the electromagnetic radiation.

20. The device according to claim 13, wherein the means for projecting the ejection agent comprises a laser.

21. The device according to claim 20, wherein the means for maintaining the object and the means for maintaining the aerogel piece(s) are positioned relative to each other so that an aerogel piece can be located opposite to the surface, while being parallel or substantially parallel thereto.

22. The device according to claim 21, wherein the dimensions of the aerogel piece are chosen so that its projection in the axis of the plume provided to be produced by the beam emitted by the laser can have, in the plane perpendicular to said axis in which this plume will have the largest dimensions, a perimeter in which the perimeter of said plume can fit.

* * * * *